United States Patent [19]

Wong

[11] Patent Number: 5,115,033
[45] Date of Patent: May 19, 1992

[54] COEXTRUDABLE ADHESIVES

[75] Inventor: Chun S. Wong, Kingston, Canada

[73] Assignee: Du Pont Canada Inc., Mississauga, Canada

[21] Appl. No.: 485,708

[22] Filed: Feb. 27, 1990

[30] Foreign Application Priority Data

Feb. 27, 1989 [UK] United Kingdom ................. 8904438

[51] Int. Cl.$^5$ .................... C08F 255/02; C09J 151/06
[52] U.S. Cl. .................................... 525/285; 525/301; 525/327.6; 428/516
[58] Field of Search ..................... 525/285, 327.6, 301

[56] References Cited

U.S. PATENT DOCUMENTS

| | | | |
|---|---|---|---|
| 3,497,574 | 2/1970 | Press | 260/897 |
| 3,607,614 | 9/1971 | MacKay | 161/218 |
| 4,505,834 | 3/1985 | Papay et al. | 525/285 |
| 4,727,120 | 2/1988 | Nagues | 525/285 |
| 4,731,095 | 3/1988 | Garapon et al. | 525/327.6 |
| 4,753,997 | 6/1988 | Shyu et al. | 525/285 |
| 4,822,688 | 4/1989 | Nogues | 525/285 |
| 4,863,999 | 9/1989 | MacLeay et al. | 525/327.6 |
| 4,868,246 | 9/1989 | MacLeay et al. | 525/327.6 |
| 4,935,476 | 6/1990 | Hasenbein et al. | 525/327.6 |
| 4,981,914 | 1/1991 | MacLeay et al. | 525/327.6 |

FOREIGN PATENT DOCUMENTS 0021694  9/1980  European Pat. Off. .

*Primary Examiner*—Carman J. Seccuro
*Attorney, Agent, or Firm*—Craig H. Evans

[57] ABSTRACT

A coextrudable adhesive composition formed from a polymer component and a catalytic agent is disclosed. The polymer component is selected from grafted polymers formed by grafting polyolefins with an ethylenically unsaturated carboxylic acid or anhydride. The catalytic agent is a monoalkyl phosphate, alkylamine, heterocyclic compound or aminocarboxylic acid. The compositions show improved adhesion to polar substrates compared with the related compositions that do not contain the catalytic agent. The compositions may be used, for example, in the bonding of ethylene/vinyl alcohol polymers to polyolefins and polyamides.

10 Claims, No Drawings

COEXTRUDABLE ADHESIVES

The present invention relates to coextrudable adhesives and especially to coextrudable adhesive compositions formed from grafted polyolefins and containing a catalyst for the promotion of adhesion to a polar substrate.

Coextrudable adhesives are used in the bonding together of two dissimilar materials, usually for the bonding of a layer of a polar polymer to a layer of a non-polar material, which is often also a polymer. For example, coextrudable adhesives may be used to facilitate bonding between layers of polymer in a coextruded film in which both layers of film are extruded, by extruding a layer of the coextrudable adhesive between the layers. In such instances, the thickness of the layer of the adhesive is usually substantially less than that of the layers of polymer being bonded.

The adhesive layer will usually contain polymers having acidic functionality. Such acidic functionality may be introduced into the polymer by grafting ethylenically unsaturated monomers onto the polymer or, alternatively, by use of copolymers of ethylene and ethylenically unsaturated acid comonomers e.g. ethylene/(meth)acrylic acid copolymers.

The grafting of polar ethylenically unsaturated monomers onto polyolefins is known, examples of which are grafting of maleic anhydride onto polypropylene, onto polyethylene (including homopolymers of ethylene and copolymers of ethylene and higher hydrocarbon alpha-olefins) and onto copolymers of ethylene with polar comonomers e.g. ethylene/vinyl acetate copolymers and ethylene/(meth)acrylate copolymers. Such grafted polymers have a variety of end-uses, including in coextrudable adhesives.

Methods for the grafting of ethylenically unsaturated monomers onto polyolefins are known in the art. One such method is described in U.S. Pat. No. 4,612,155 of C. S. Wong and R. A. Zelonka, which issued Sep. 16, 1986. Other examples are described in published European patent application 0 266 994 of P. C. Wong, published May 11, 1988 and in European patent applications Nos. 89.312019.6 and 89.312020.4 of E. C. Kelusky, both filed Nov. 20, 1989.

An example of an adhesive composition based on polypropylene that has been grafted with an acidic unsaturated monomer and formed into an adhesive composition is disclosed in U.S. Pat. No. 4,727,120 of P. Nogues, issued Feb. 23, 1988. This patent discloses compositions of (i) polypropylene containing at least 50 mol percent of propylene and which has been grafted with an unsaturated monomer containing an anhydride group and (ii) compounds, which may be polymeric, containing at least two groups that are reactive with the acid anhydride group. The preferred compounds contain at least two alcohol groups, examples of which include glycols e.g. ethylene glycol, diols, triols, sucrose and polyalkylene glycols, hydroxylated ethylene/vinyl acetate copolymers and the other similar compounds. Other compounds include alpha, omega-diamino polyamide oligomers of various molecular weights that have been obtained by polycondensation in the presence of a diamine e.g. salts of a diacid and a diamine, amino acids and lactams. Examples of the diamine are stated to be hexamethylene diamine, nonamethylene diamine, undecamethylene diamine, dodecamethylene diamine, metaxylylene diamine and bis-p-aminocyclohexylmethane. It is disclosed in the patent that monofunctional compounds containing a group that is reactive with the acid anhydride group are ineffective in improving adhesion of adhesive compositions.

It has now been found that the adhesion of coextrudable adhesives formed from grafted polyolefins may be improved by incorporation of a catalytic amount of an acidic or basic agent.

Accordingly, the present invention provides a coextrudable adhesive composition comprising:

(a) an acid copolymer selected from the group consisting of polyolefins grafted with at least one of an ethylenically unsaturated carboxylic acid and an ethylenically unsaturated carboxylic acid anhydride, said grafted polyolefin containing a total amount of at least 0.001% by weight of carboxylic acid and carboxylic acid anhydride groups; and (b) a catalytic amount of an agent selected from the group consisting of monoalkyl phosphates, dialkyl phosphates, monoalkylamines, dialkylamines, trialkylamines, heterocyclic amino compounds, aminocarboxylic acids and salts of such acids.

In a preferred embodiment of the coextrudable adhesive compositions of the present invention, the polyolefin that is grafted is selected from the group consisting of homopolymers and copolymers of hydrocarbon alpha-olefins having 2-8 carbon atoms and ethylene/vinyl alkanoate copolymers.

In another embodiment, the grafted polyolefin is a grafted polyethylene.

In yet another embodiment, the ethylenically unsaturated carboxylic acid and ethylenically unsaturated carboxylic acid anhydride are maleic acid and maleic anhydride, respectively.

In a further embodiment, the agent is selected from histidine, quinoline and tributylamine.

The polyolefin that is grafted may be a homopolymer or copolymer of one or more hydrocarbon alpha-olefins having 2-8 carbon atoms, including polypropylene and polyethylene; it is understood that the expression "copolymer" includes terpolymers and other polymers formed from mixtures of monomers. As used herein "polypropylene" refers to homopolymers of propylene, to impact or so-called block copolymers of propylene with ethylene in which the ethylene content is less than about 25% by weight and to random copolymers of propylene with ethylene in which the ethylene content is less than about 8% by weight.

The polyethylene may be a homopolymer of ethylene or a copolymer of ethylene with at least one $C_4$–$C_{10}$ higher alpha-olefin, especially copolymers of ethylene with butene-1, hexene-1 and/or octene-1. The density of the polyethylene will depend to a large extent on the intended end use of the coextrudable adhesive. Thus, in embodiments the density may range from about 0.890 g/cm$^3$ to about 0.970 g/cm$^3$ and the melt index, as measured by the procedure of ASTM D-1238 (Condition E), may range up to about 200 dg/min.

The polyolefin that is grafted may also be a copolymer of ethylene and a vinyl alkanoate e.g. ethylene/vinyl acetate copolymer, or a copolymer of ethylene and alkyl(meth)acrylate, examples of which are ethylene/ethyl acrylate copolymers, ethylene/methyl acrylate copolymers, ethylene/butyl acrylate copolymers and ethylene/methyl methacrylate copolymers. The copolymer may also be a copolymer of ethylene with carbon monoxide, optionally also containing one of the polar monomers mentioned above, examples of which are ethylene/carbon monoxide, ethylene/butyl acrylate/carbon monoxide, and ethylene/vinyl acetate/carbon monoxide copolymers. Such copolymers are known in the art and many examples are available commercially.

The grafted polyolefin may be formed by grafting an ethylenically unsaturated monomer onto a polyolefin defined above. The monomer grafted onto the polyolefin is at least one ethylenically unsaturated monomer selected from ethylenically unsaturated carboxylic acids and ethylenically unsaturated carboxylic acid anhydrides. Examples of the acids and anhydrides, which may be mono-, di- or polycarboxylic acids, are acrylic acid, methacrylic acid, maleic acid, fumaric acid, itaconic acid, crotonic acid, itaconic anhydride, nadic anhydride, maleic anhydride and substituted maleic anhydride e.g. dimethyl maleic anhydride.

Methods for the grafting of monomers onto polymers are known in the art e.g. the methods of C. S. Wong and R. A. Zelonka, of P. C. Wong and E. C. Kelusky referred to above.

As is illustrated herein, compositions of the catalytic agent with the graft polymers exhibit significant increases in adhesion, whereas related compositions in which the graft polyolefin has been replaced with an (ungrafted) acid copolymer viz. a copolymer of ethylene and ethylenically unsaturated carboxylic acid(s) and optionally other ethylenically unsaturated monomers, or ionomers thereof, do not exhibit such increases in adhesion.

In addition to the grafted copolymer, an ungrafted polymer may be added to the coextrudable adhesive composition. The ungrafted polymer may be of the type described above with respect to polymers that may be grafted, it being understood that the polyolefin of the grafted polyolefin and of the added ungrafted polyolefin in any coextrudable adhesive composition may be the same of different.

The agent is selected from the group consisting of monoalkyl phosphates, dialkyl phosphates, monoalkylamines, dialkylamines, trialkylamines, heterocyclic amino compounds, amino carboxylic acids and salts of such acids. Dialkylamines may also be useful. The amino carboxylic acids should be neutral or basic in nature. Examples of such agents include dibutyl phosphate, tributylamine, trioctylamine, benzimidazole, histidine, arginine, lysine, sodium glycine salt, quinoline and piperazine. Melt compounding equipment that is capable of providing good dispersion of the ingredients in the composition may be used in the preparation of the coextrudable adhesive compositions of the invention. For example, the compositions of the invention may be formed by feeding each of the ingredients to a compounding extruder.

Alternatively, the compositions of the invention may be formed in a single extruder. For example, the grafting of the polyolefin may be conducted in an extruder and, prior to extrusion of the grafted material from the extruder, the agent plus any ungrafted polyolefin may be fed to the extruder and compounded in to form the coextrudable adhesive. Such compounding of the adhesive may use the techniques described in the aforementioned applications of E. C. Kelusky.

The coextrudable adhesives of the present invention contain 0.001 to 0.5% by weight of the agent, especially 0.003 to 0.05% by weight of the agent. In addition, the coextrudable adhesives formed should contain 0.01 to 5% by weight, especially 0.05 to 2% by weight of the ethylenically unsaturated carboxylic acid or anhydride.

The coextrudable adhesives of the present invention may be used in the bonding of a variety of substrates. For example, the adhesives may be used in the bonding of ethylene/vinyl alcohol copolymers (EVOH) to polyethylene or polypropylene, polyamide to polyethylene or polypropylene, and polyamide to ethylene/vinyl acetate copolymers. The coextrudable adhesives may also be used in the bonding of polymers to metal substrates e.g. aluminum, steel or copper. In the coextrusion of EVOH, the adhesives are usually extruded at temperatures in the range of 200°–238° C., whereas in the coextrusion of polyamides the adhesives are usually extruded at temperatures in the range of 230°–275° C.

The coextrudable adhesives of the present invention may be used in coextrusion processes for the bonding together of layers of coextrudable materials. The adhesives may also be useful in other processes e.g. in co-blow moulding processes, powder coating processes, lamination processes or the like.

The present invention is illustrated by the following examples:

EXAMPLE I

Compositions of polyethylene, grafted polyethylene and agent were prepared by blending the ingredients in a 40 mm Berstorff® co-rotating twin screw extruder. The polyethylene was a linear low density polyethylene having a density of 0.920 g/cm$^3$ and a melt index of 1.4 dg/min. The grafted polyethylene had been prepared by grafting maleic anhydride onto a polyethylene that was a high density polyethylene having a density of 0.960 g/cm$^3$ and a melt index of 5 dg/min, such that the grafted polymer contained 1% by weight of grafted monomer. The agents, which are listed in Table I, were liquids and were introduced into the extruder by injection through a port in the extruder.

The coextrudable adhesive composition contained 90% by weight of polyethylene and 10% by weight of grafted polyethylene. The amount of agent is given in Table I. The adhesive composition was coextruded with an ethylene/vinyl alcohol copolymer (EVOH) to form a two-layer cast film. In the coextrusion process, the melt temperature of both the EVOH and the adhesive was 200° C., with the die temperature being set at 210° C. Samples of the resultant coextruded film were than tested on an Instron® tester to determine the level of adhesion between the EVOH and the coextruded adhesive, by performing a 180° peel test.

Further details and the results obtained are given in Table I.

TABLE I

| Run No. | Agent | Amount (ppm) | Adhesion g/cm |
| --- | --- | --- | --- |
| 1 | — | — | 115 |
| 2 | dibutyl phosphate | 100 | 175 |
| 3 | dibutyl phosphate | 75 | 140 |
| 4 | tributylamine | 100 | 230 |
| 5 | tributylamine | 50 | 240 |
| 6 | trioctylamine | 500 | 225 |
| 7 | trioctylamine | 250 | 210 |
| 8 | — | — | 105 |

N.B. Runs 1 and 8 are control runs, without addition of agent

The results show that addition of the agent improved the adhesion between the coextruded polymers. In each run, it was the bond between the coextruded adhesive and the EVOH that failed.

EXAMPLE II

Compositions of polyethylene, grafted polyethylene and agent were prepared by blending the ingredients in a Wilmod ® 2.54 cm single screw extruder. The polyethylene was a linear low density polyethylene having a density of 0.920 g/cm³ and a melt index of 1.4 dg/min. The grafted polyethylene had been prepared by grafting maleic anhydride onto a polyethylene that was a high density polyethylene having a density of 0.960 g/cm³ and a melt index of 5 dg/min, such that the grafted polymer contained 1% by weight of grafted monomer.

The agents, which are listed in Table II, were introduced into the extruder by the following methods. For solid agents, concentrates were made by melt compounding a dry blend of the agent (0.5% by weight) in a powdered linear low density polyethylene (density 0.920 g/cm³, melt index 1.4 dg/min). The quinoline concentrate was made by impregnating linear low density polyethylene powder with a solution of quinoline in methylene chloride, followed by vaporization of the methylene chloride under ambient conditions, dry blending the resultant powder and then melt compounding to produce the concentrate fed to the extruder.

The coextrudable adhesive composition contained 90% by weight of polyethylene and 10% by weight of grafted polyethylene. The amount of agent is given in Table II below. The adhesive composition was coextruded with EVOH, to form a two-layer coextrusion cast film. The die temperature was set at 230° C. The melt temperature of the EVOH was 220° C. and that of the coextrudable adhesive was 200° C. Samples of the resultant coextruded film were then tested on an Instron ® tester to determine the level of adhesion between the EVOH and the coextrudable adhesive, by performing a 180° peel test.

Further details and the results obtained are given in Table II.

TABLE II

| Run No. | Agent | Amount (ppm) | Adhesion g/cm |
|---|---|---|---|
| 9 | — | — | 285 |
| 10 | benzimidazole | 500 | 420 |
| 11 | L-histidine | 100 | 410 |
| 12 | L-histidine | 200 | 1055 |
| 13 | glycine, sodium salt | 100 | 545 |
| 14 | — | — | 285 |
| 15 | quinoline | 100 | 470 |
| 16 | — | — | 260 |

N.B. Runs 9, 14 and 16 are control runs, without addition of agent

The results show that addition of the agent improved the adhesion between the coextruded polymers. In each run, the samples failed by failure of the bond between the coextruded adhesive and the EVOH.

EXAMPLE III

Compositions of polyethylene, grafted polyethylene and agent were prepared by blending the ingredients in a Wilmod ® 2.54 cm single screw extruder. The polyethylene was a linear low density polyethylene having a density of 0.920 g/cm³ and a melt index of 1.4 dg/min. The grafted polyethylene had been prepared by grafting maleic anhydride onto a polyethylene that was a high density polyethylene having a density of 0.960 g/cm³ and a melt index of 5 dg/min, such that the grafted polymer contained 1% by weight of grafted monomer.

The agents are listed in Table III, and were prepared in the same manner as in Example II, except that the concentrate used in Run 21 was prepared in the same manner as the concentrate in Run 5.

The coextrudable adhesive composition contained 90% by weight of polyethylene and 10% by weight of grafted polyethylene. The amount of agent is given in Table III below. The adhesive composition was coextruded between EVOH and high density polyethylene, to form a three layer cast film of the structure EVOH/coextrudable adhesive/polyethylene. The coextrusion temperature was 230° C. and the residence time of the polymers in the die was estimated to be 2 minutes. Samples of the resultant coextruded film were then tested on an Instron ® tester to determine the level of adhesion between the EVOH and the coextrudable adhesive, by performing a 180° peel test.

Further details and the results obtained are given in Table III.

TABLE III

| Run No. | Agent | Amount (ppm) | Adhesion g/cm |
|---|---|---|---|
| 17 | — | — | 785 |
| 18 | L-histidine | 150 | 915 |
| 19 | L-histidine | 200 | 1020 |
| 20 | quinoline | 75 | 965 |
| 21 | tributylamine | 50 | 1040 |
| 22 | — | — | 805 |

N.B. Runs 17 and 22 are control runs, without addition of agent

The results show that addition of the agent improved the adhesion between the coextruded polymers. In each run, the bond failure was between the coextruded adhesive and the EVOH.

EXAMPLE IV

A series of coextrudable adhesive compositions were prepared by melt compounding polymeric components in a 25 mm twin screw extruder at a melt temperature of 180° C. Tri-n-butylamine was added as the catalytic agent by injection into the extruder during blending of the composition.

The coextrudable adhesive compositions were coextruded with EVOH at 200° C., to form a two-layer coextrusion cast film. Samples of the resultant coextruded film were then tested on an Instron ® tester to determine the level of adhesion between the EVOH and the coextrudable adhesive, by performing a 180° peel test.

The following polymer compositions were prepared:

A ... 82% by weight of a homopolymer of propylene having a density of 0.905 g/cm³ and a melt flow index of 0.8 dg/min; 15% by weight of an ethylene/butene-1/octene-1 copolymer having a density of 0.910 g/cm³ and a melt index of 1.9 dg/min and 3% by weight of a homopolymer of propylene that had been melt grafted with 3.4% by weight of maleic anhydride;

B ... an ethylene/methacrylic acid copolymer having 9% by weight of methacrylic acid, a density of 0.934 g/cm³ and a melt index of 2.5 dg/min;

C ... an ionomer of an ethylene/methacrylic acid copolymer containing 9% by weight of methacrylic acid, with zinc as the metal component, having a density of 0.936 g/cm³ and a melt index of 5 dg/min; and D ... 95% by weight of an ethylene/vinyl acetate copolymer having 9% by weight of vinyl acetate, a density of 0.930 g/cm³ and a melt index of 2 dg/min, and 5% by weight of the same polymer that had been melt grafted with 1.5% by weight of maleic anhydride.

Further experimental details and the results obtained were as follows:

TABLE IV

| Run No. | Polymer Composition | Amount of Agent (ppm) | Adhesion (g/cm) |
|---|---|---|---|
| 23 | A | 50 | 156 |
| 24 | A | 0 | 61 |
| 25 | B | 500 | 28 |
| 26 | B | 100 | 31 |
| 27 | B | 1000 | 22 |
| 28 | B | 0 | 25 |
| 29 | C | 500 | 6.3 |
| 30 | C | 100 | 5.9 |
| 31 | C | 1000 | 5.5 |
| 32 | C | 0 | 5.1 |
| 33 | D | 500 | 72 |
| 34 | D | 100 | 48 |
| 35 | D | 1000 | 44 |
| 36 | D | 0 | 33 |

The coextrudable adhesive compositions of "A" and "D" i.e. formed with graft polymers, showed significant increases in adhesion when the catalytic agent was added, as shown by comparison of the adhesion obtained with the control runs i.e. runs with 0 ppm of agent, and the runs with agent. However, the compositions of "B" and "C" i.e. formed with acid copolymers and ionomers, did not show any significant increase in adhesion on addition of the agent.

I claim:

1. A coextrudable adhesive composition comprising:
   (a) an acid copolymer selected from the group consisting of polyolefins grafted with at least one of an ethylenically unsaturated carboxylic acid and an ethylenically unsaturated carboxylic acid anhydride, said grafted polyolefin containing a total amount of at least 0.001% by weight to 5% by weight of carboxylic acid and carboxylic acid anhydride groups; and
   (b) a catalytic amount up to 0.5% by weight of an agent selected from the group consisting of monoalkyl phosphates, dialkyl phosphates, monoalkylamines, dialkylamines, trialkylamines, heterocyclic amino compounds, aminocarboxylic acids and salts of such acids; the amines being monoamines; the heterocyclic amino compounds being selected from the group consisting of benzimidazole, histidine, quinoline and piperazine; and the aminocarboxylic acids being selected from the group consisting of glycine, arginine and lysine.

2. The coextrudable adhesive composition of claim 1 in which the polyolefin that is grafted is selected from the group consisting of homopolymers and copolymers of hydrocarbon alpha-olefins having 2-8 carbon atoms and ethylene/vinyl alkanoate copolymers.

3. The coextrudable adhesive composition of claim 2 in which the grafted polyolefin is a grafted polyethylene.

4. The coextrudable adhesive composition of claim 3 in which the ethylenically unsaturated carboxylic acid and ethylenically unsaturated carboxylic acid anhydride are maleic acid and maleic anhydride, respectively.

5. The coextrudable adhesive composition of claim 4 in which the agent is selected from histidine, quinoline and tributylamine.

6. The coextrudable adhesive composition of claim 4 in which the agent is selected from the group consisting of monoalkyl phosphates, dialkyl phosphates, monoalkylamines, dialkylamines, trialkylamines and heterocyclic amino compounds.

7. The coextrudable adhesive composition of claim 6 in which the grafted polyolefin contains 0.01 to 5% by weight of carboxylic acid and carboxylic acid anhydride groups.

8. The coextrudable adhesive composition of claim 5 in which the grafted polyolefin contains 0.05 to 2% by weight of carboxylic acid and carboxylic acid anhydride groups.

9. The coextrudable adhesive composition of claim 6 in which the composition contains 0.001 to 0.5% by weight of agent.

10. The coextrudable adhesive composition of claim 5 in which the composition contains 0.003 to 0.05% by weight of agent.

* * * * *